# United States Patent [19]

Fletcher et al.

[11] 4,069,212
[45] Jan. 17, 1978

[54] FLAME RETARDANT SPANDEX TYPE POLYURETHANES

[76] Inventors: James C. Fletcher, Administrator of the National Aeronautics and Space Administration, with respect to an invention of; John T. Howarth, Reading, Mass.; Suresh Sheth, Somerville, Mass.; Kenneth R. Sidman, Wayland, Mass.; Arthur A. Massucco, Natick, Mass.

[21] Appl. No.: 657,907

[22] Filed: Feb. 13, 1976

Related U.S. Application Data

[62] Division of Ser. No. 374,421, June 28, 1973, Pat. No. 3,956,233.

[51] Int. Cl.$^2$ .............................................. C08G 18/10
[52] U.S. Cl. .................... 260/77.5 SP; 260/75 NH; 260/75 NK; 260/75 NT; 260/77.5 AM; 260/77.5 AN; 260/77.5 AP; 260/77.5 AT
[58] Field of Search ................ 260/2.5 AJ, 2.5 AV, 260/77.5 AM, 77.5 SP, 75 NK, 75 NH, 77.5 AQ, 77.5 AP, 77.5 AN, 77.5 AT, 75 NT

[56] References Cited

U.S. PATENT DOCUMENTS

| | | | |
|---|---|---|---|
| 3,146,220 | 8/1964 | Hindersinn et al. | 260/75 NK |
| 3,256,506 | 6/1966 | Anderson et al. | 260/75 NK |
| 3,264,233 | 8/1966 | Trescher et al. | 260/77.5 AP |
| 3,275,678 | 9/1966 | Bernstein et al. | 260/75 NK |
| 3,391,092 | 7/1968 | Worsley et al. | 260/77.5 AP |
| 3,391,111 | 7/1968 | Morgan | 260/77.5 SP |
| 3,405,097 | 10/1968 | Lusskin et al. | 260/75 NH |
| 3,475,383 | 10/1969 | Stewart | 260/77.5 AM |
| 3,509,102 | 4/1970 | Horn et al. | 260/77.5 SP |
| 3,536,782 | 10/1970 | Toggweiler et al. | 260/2.5 AV |
| 3,542,740 | 11/1970 | Pumpelly et al. | 260/77.5 AP |
| 3,567,665 | 3/1971 | Carpenter et al. | 260/77.5 AP |
| 3,577,388 | 5/1971 | Megua et al. | 260/77.5 SP |
| 3,585,185 | 6/1971 | Levis, Jr. et al. | 260/2.5 AV |
| 3,642,646 | 2/1972 | Marcus | 260/75 NK |
| 3,676,376 | 7/1972 | Svobodie et al. | 260/2.5 AV |
| 3,708,443 | 1/1973 | Toggweiler et al. | 260/75 NK |
| 3,719,639 | 3/1973 | Reetz et al. | 260/77.5 AM |
| 3,723,392 | 3/1973 | Konig et al. | 260/77.5 SP |
| 3,764,577 | 10/1973 | Burns et al. | 260/47 CB |
| 3,793,238 | 2/1974 | Winkelmann et al. | 260/77.5 SP |
| 3,869,502 | 3/1975 | Papa et al. | 260/2.5 AV |
| 3,907,722 | 9/1975 | Papa et al. | 260/77.5 AM |
| 3,919,166 | 11/1975 | Brachman | 260/2.5 AJ |
| 3,935,166 | 1/1976 | Kanai et al. | 260/75 NK |
| 3,943,077 | 3/1976 | Bell et al. | 260/2.5 AV |

FOREIGN PATENT DOCUMENTS 1,063,605  3/1967  United Kingdom.

*Primary Examiner*—Eugene C. Rzucidlo
*Attorney, Agent, or Firm*—Russell E. Schlorff

[57] ABSTRACT

Flame retardant elastomeric compositions comprised of either spandex type polyurethane having incorporated into the polymer chain halogen containing polyols, conventional spandex type polyurethanes in physical admixture with flame retardant additives or fluoroelastomeric resins in physical admixture with flame retardant additives, methods of preparing fibers of the flame retardant elastomeric materials and articles of manufacture comprised of the flame retardant elastomeric materials and non-elastic materials such as polybenzimidazoles, fiberglass, nylons, etc.

4 Claims, No Drawings

FLAME RETARDANT SPANDEX TYPE POLYURETHANES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457)

This is a division of application Ser. No. 374,421, filed 6/28/73, now U.S. Pat. No. 3,956,233.

BACKGROUND OF THE INVENTION

1. Field of the Invention

The present invention relates to novel flame retardant, elastomeric compositions, methods of producing fibers and filaments therefrom and to articles of manufacture incorporating the elastomeric compositions.

2. Brief Description of the Prior Art

In space exploration, extravehicular activity (EVA) is essential. Such activity necessarily requires the use of high strength elastomeric materials from which to fabricate both garments and carrying bags used in such activity. The fibers used to form the elastomeric materials must have good strength, elongation, modulus, and recovery over the extreme temperature and pressure ranges normally encountered in the space equipment. Because of the high oxygen atmospheres normally encountered in space vehicles, the garments, carrying bags, etc. must be flame retardant lest a serious safety hazard be posed. While certain, mainly synthetic polymeric materials, have the requisite mechanical properties and recovery characteristics necessary for use in such environments, they suffer from the infirmity that they are not flame retardant and indeed in many cases are highly flammable.

The prior art, as exemplified by U.S. Pat. Nos. 3,162,609, 3,076,010 and 3,134,742, discloses polyurethane compositions showing enhanced flame retardant properties. However, the compositions disclosed in those patents are directed towards foamed polymers and not elastomeric type material suitable for the production of fibers and filaments. The production of a fire retardant fiber presents special problems because of the high surface area of the fiber. Accordingly, attempts to resort to the techniques to render foams and other such structures flame retardant, if applied to fibrous elastomeric materials tends to destroy or seriously impair the physical properties of the fibers thereby rendering them useless for weaving, knitting or other fabric making techniques.

SUMMARY OF THE INVENTION

It is therefore an object of the present invention to provide a novel, fire retardant composition.

It is another object of the present invention to provide fire retardant elastomeric compositions in which the polymeric backbone has incorporated therein halogens.

Yet another object of the present invention is to provide a novel class of fire retardant elastomeric polyurethanes produced from halogen containing polyols.

Still another object of the present invention is to provide novel, flame retardant elastomeric compositions in which a normally flammable elastomer is physically mixed with certain fire retardant additives.

Yet another object of the present invention is to provide flame retardant elastomeric compositions which are totally non-flammable in a 70% oxygen atmosphere.

An important object of the present invention is to provide flame retardant elastomeric compositions which have good mechanical and recovery properties.

Yet another object of the present invention is to provide methods for the production of fibers or filaments of flame retardant, elastomeric compositions.

These and other objects of the present invention will become apparent from the description given herein and the appended claims.

In accordance with the above stated objects, the present invention, in one aspect, provides a flame retardant polyurethane containing an organic polyisocyanate and a halogen containing polyol, the reactive groups of the polyol comprising hydroxyl groups, the preferred halogen being bromine.

In yet another embodiment of the present invention, the flame retardant compositions herein are comprised of certain elastomeric synthetic resins and flame retardant additives, the flame retardant additives being either halogenated organic compounds, organic phosphorous compounds or mixtures of the two.

Another embodiment of the present invention involves a method of producing flame retardant, elastomeric filaments or fibers in which the above described elastomeric composition, if containing a polyurethane of the spandex type, is spun into a plurality of fibers which are then coalesced to a single filament, the coalesced filament being subsequently dried. Where the elastomeric polymer is of the fluorocarbon type, a method for producing fire retardant elastomeric filament is provided which includes extruding the elastomeric composition into a filament or fiber, treating the filament or fiber with a release agent and curing the thus obtained filament at elevated temperatures.

DESCRIPTION OF THE PREFERRED EMBODIMENTS

The flame retardant compositions of the present invention are basically of two general types; polyurethanes which have incorporated in the polymer backbone, halogen containing polyols, the polyols serving to impart flame retardancy to the polymer, and conventional elastomeric materials, which vary in flammability but which are modified by the addition of certain fire retardant additives to produce compositions which are substantially non-flammable.

Polyurethanes which are flexible in nature and therefore suitable for forming fibers have been given the generic term spandex. Generally speaking, the term spandex refers to elastomeric fibers in which at least 85% of the fiber-forming substance consists of segmented polyurethane. The spandex type polyurethanes are referred to as segmented because of the fact that they consist of an alternate arrangement of "soft" segments consisting of either polyester or polyether blocks and "hard" segments that generally contain aromatic urea and sometimes urethane groups as the rigid components. The rigid segments are derived from the reaction of the isocyanates with urea producing compounds such as amines, water, etc. The production of polyurethanes or isocyanate polymers is a well known commercial process, see for instance Kirk-Othmer, *The Encyclopedia of Chemical Technology*, First Supplement, pages 888 et seq, (Interscience, 1957). Briefly, the process involves the reaction of an isocyanate and a second compound which contains an active hydrogen group such as a hydroxyl, amino or carboxy group. The general procedure in the production of polyurethane fibers and the procedure generally employed herein is to treat a hydroxy-terminated polyester or polyether polyol with a polyisocyanate, usually at temperatures between 75° and 125° C to produce what is known as a prepolymer. Generally speaking, about two moles of the polyisocyanate are employed for each mole of the polyol to insure that the prepolymer is terminated on both ends by an isocyanate group. The isocyanate terminated prepolymer is then usually dissolved in a suitable solvent such as, for example, anhydrous dimethylformamide and an aliphatic diamine such a hydrazine is added in amounts equivalent to the polyisocyanate to extend the polymer into the segmented structure described above.

In the preferred embodiment the resulting polymer is linear in character and it exhibits little or no cross-linking. Thus, the polymer may be fabricated by standard thermal processing methods such as extrusion, compression molding, injection molding, etc.; and further, may be dissolved in a suitable solvent and be cast (e.g., to form films) or be extruded into fibers.

In preparing the polyurethanes in which the polymer backbone contains a halogen containing polyol, numerous polyisocyanates can be employed. Nonlimiting examples of useful polyisocyanates include the following: 2,4-tolylene diisocyanate, 2,6-tolylene diisocyanate, the phenylene diisocyanates such as 4,4-diphenylmethane diisocyanate, the naphthalene diisocyanates, 1,2,4-benzene triisocyanate, hexamethylene diisocyanate, trimethylene diisocyanate, ethylene diisocyanate, 1,4-cyclohexylene diisocyanate, 1,3-cyclopentylene diisocyanate and mixtures thereof. Particularly preferred polyisocyanates are 4,4'-diphenylmethane diisocyanate and arylene diisocyanates, that is, those in which each of the two isocyanate groups is attached directly to an aromatic ring as for example the toluene diisocyanates.

The other main constituent of the polyurethanes of the present invention in which halogens are chemically incorporated into the backbone are polyols containing halogen groups, the reactive groups of the polyol being hydroxyl groups. In this group may be mentioned dibromoneopentyl glycol, polyesters of dibromoneopentyl glycol, esters of the product obtained from the reaction of ethylene oxide and tetrabromophthalic anhydride, esters of the product obtained from the reaction of propylene oxide and tetrabromophthalic anhydride, and esters obtained from the reaction of ethylene oxide, propylene oxide and tetrobromophthalic anhydride. In general, the preferred halogen containing polyols are those in which the halogen is bromine and particularly preferred are polyols derived from dibromoneopentyl glycol and tetrabromophthalic anhydride.

Since one of the primary objects of this invention is the development of a high molecular weight linear, non-cross-linked polymer, it is important that all monofunctional and tri-functional impurities be removed from the dibromoneopentyl glycol prior to reaction. This may be accomplished, for example, by fractional crystallization from hot water. The monofunctional material, being least soluble, crystallizes from solution first. These crystals are then filtered and discarded. Upon further cooling of the solution, the desired difunctional material begins to crystallize out. These crystals are filtered from solution and recovered. The remaining solution then contains the highly soluble trifunctional material, which is discarded.

In imparting flame retardancy to the polyurethanes produced herein, the "soft" segment of the polymers were modified by forming them from the halogen containing polyols described above. This can be accomplished in several ways. In one method, the halogen containing polyol can be reacted with a difunctional acid such as adipic acid to produce a hydroxy terminated polyester which can in turn be reacted with a polyisocyanate to form an isocyanate terminated polyester prepolymer. In another case, the halogen containing glycol can be reacted with the polyisocyanate to produce a material containing NCO groups which can in turn be reacted with a polyether glycol or a polyester glycol to produce the polyurethane prepolymer. In general, it is desirable that the base polyol used to produce the prepolymer have a molecular weight of from 1,500 to 5,000. However, polyols having a molecular weight of 1,000 can be employed if they are first reacted with a polyisocyanate such as toluene diisocyanate in a ratio of one mole of polyol to ½ mole of the toluene diisocyanate. This will result in the formation of a base diol having a molecular weight of approximately 2,000. A particularly desirable polyester polyol is a polybutylene adipate having a molecular weight of approximately 2,000 whereas a desirable polyether polyol is polytetramethylene ether glycol having a molecular weight ranging from around 600 to around 1,200.

The above described polyurethane prepolymer having halogen in the polymer background can be extended to form fire retardant elastomeric polyurethanes having good mechanical properties by reacting them with urea producing compounds such as water or amines, especially diamines, a particularly desirable amine being hydrazine.

The reaction of the prepolymers and hydrazine yields a polyurethane of the general structure:

wherein R is the "soft" segment containing the halogen containing polyol.

The process parameters, including relative proportions of the ingredients, used in preparing the halogen containing polyurethanes are those generally employed in the preparation of spandex type polyurethanes, the conditions being adjusted according to well known techniques to accommodate preparation of a polyester type spandex or a polyether type spandex. Such parameters are set out and described in the above noted *Encyclopedia of Chemical Technology* and numerous ether well known works dealing with the production of polyurethanes.

Elastomeric, flame retardant compositions exhibiting good mechanical properties and recovery can also be produced by blending a normally flammable elastomeric material and certain fire retardant additives.

Nonlimiting examples of elastomeric materials which exhibit some degree of flammability under certain circumstances but which can be made highly flame retardant by the addition of specified additives include conventional polyurethanes of both the polyether and polyester types, chlorinated polymers such as polyvinylchloride, polyvinylidenechloride, fluorinated polymers such as polyvinylfluoride, polyvinylidenefluoride, copolymers of vinyldene fluoride and hexafluoropropylene, polyepichlorohydrins, chlorosulfonated polyethylene, mixtures of the above, etc. Particularly preferred, because of good mechanical properties, are the polyurethanes and the fluoroelastomeres such as are formed from copolymerizing vinylidene fluoride and hexafluoropropylene. Since halogenated polymeric resins contain an inherent degree of flame retardancy due to their halogen content, extremely desirable elastomeric formulations can be obtained when a normally, quite flammable elastomer such as polyurethane is combined with a relatively nonflammable elastomer such as a halogen containing polymer and, in addition, contain fire retardant additives are incorporated into the blend.

The fire retardant additives most useful in the composition of the present invention fall into two main categories; halogenated compounds and organic phosphorous containing compounds. As for the halogenated compounds, it has been found that the brominated compounds and more particularly brominated aromatic compounds are excellent fire retardant additives and when used in proper proportions, do not destroy the mechanical properties of the elastomeric compositions. Nonlimiting examples of halogen containing additives which can be employed in the compositions of the present invention include tetrabromoethylene aniline, hexabromocyclododecane, hexabromobenzene, decabromodiphenyl, decabromobiphenyl oxide, carbon tetrabromide, tetrafluoroethylene, tetrabromoethane, tetrabromobutane, etc. Included within the term halogenated compounds are halogenated polymers.

Nonlimiting examples of the organic phosphorous containing compounds which act as useful fire retardant additives in the compositions of the present invention include tris-2,3-dibromopropylphosphate, tris-1-bromochloropropylphosphate, tris-beta-chloroethylphosphate, tricresyl phosphate, and the like. Particularly preferred organic phosphorous compounds are tris-2,3-dibromopropylphosphate, tris-1-bromochloropropylphosphate, tricresylphosphate and mixtures thereof.

Particularly advantageous fire retardancy is achieved by using mixtures of the halogenated, and more particularly the brominated fire retardant additives and the organic phosphorous containing compounds. Thus, for example, the use of hexabromobenzene and tris-2,3-dibromopropylphosphate in a polyurethane type composition or the use of decabromodiphenyl and tricresylphosphate in a fluoroelastomeric composition provides elastomeric formulations which exhibit excellent flame retardant properties together with good mechanical properties and recovery characteristics.

In formulating the fire retardant elastomeric compositions of the present invention in which a flammable or partially flammable elastomer is admixed with fire retardant additives, the elastomeric material is present in the compositions generally in amounts ranging from about 5 to about 70% by weight. The precise amount of the fire retardant additives incorporated into the flame retardant compositions will of course vary depending upon the degree of fire retardancy desired, the flammability characteristics of the elastomer, the maintenance of certain mechanical and recovery properties and other such parameters. In general, however, the fire retardant additives will be present in amounts ranging from about 30 to about 95% by weight.

It is to be noted that in all cases different percentages of the elastomer can be employed, i.e., higher amounts of the elastomer relative to the fire retardant additive, the result being that the fire retardant properties of the compositions are reduced albeit not completely destroyed.

It has been found that when a normally flammable elastomer such as polyurethane is employed, the amount of fire retardant additive which must be incorporated into the composition is generally quite high. Thus for example when a polyurethane is employed as the elastomer, the composition will contain from 3 to 30% of the polyurethane, the balance being comprised primarily of fire retardant additives. When relatively non-flammable elastomer, such as a fluoroelastomer, is employed, the amount of flame retardant additives which must be incorporated to achieve the desired degree of flame retardancy is greatly reduced. Thus in the case where a vinylidene fluoride-hexafluoropropylene copolymer such as Viton (manufactured by Du Pont) is employed, the amount of the elastomer in the composition will generally vary from about 15 to about 65% by weight. It is to be noted that in all cases different percentages of the elastomer can be employed i.e., higher amounts of the elastomer relative to the fire retardant additive, the result being that the fire retardant properties of the compositions are reduced albeit not completely destroyed.

Other than the above named fire retardant additives, other fire retardants and other materials such as plasticizers, anti-oxidants cross-linking and curing agents, etc. may be incorporated into the compositions. It has been found, for example, that the addition of certain metal oxides to polyurethane formulations decreased the flammability of the composition. Typically, the fluoroelastomer compositions are cured by means of a diamine (e.g., N,N'-dicinnamylidene-1,6-hexane diamine) and a metal oxide, the preferred metal oxide for the achievement of flame retardant properties being lead oxide. A particularly effective cure system for the fluoroelastomer compositions is one based on maleimide N-(-4-carboxyphenol) maleimide, a peroxide such as benzoyl or dicumylperoxide, and lead oxide. This provides products with extremely high tensile strength and high elongation that is particularly suitable for making flameproof fiber. Normally, the additional components listed above will not exceed 25% by weight of the composition and more generally will range from about 1 to about 20% by weight.

When a fluoroelastomer is employed in the flame retardant compositions of the present invention, it is normally desirable that curing agents be incorporated into the formulation. Thus for example certain metallic oxides such as lead oxide, magnesium oxide, etc., in combination with the amine type curing agents such as hexamethylenediaminecarbamate, N-dicinnamylidene-1,6-hexane diamine, etc., provide excellent curing of the compositions. It is to be understood that the curing agents mentioned above are merely exemplary of curing agents which may be employed in the elastomeric compositions to obtain the desired mechanical properties. When a curing agent is employed in the compositions of the present invention, it will generally be present in amounts ranging from about 1 to about 25% (wt.) where the percentages apply to the combined amounts if the curing agent is of the mixed type i.e., metal oxide and amine, or to a single component if such is employed.

Particularly desirable flame retardant elastomeric compositions employing a spandex type polyurethane can be produced from a formulation containing approximately 15 to 25% of the spandex type polyurethane, approximately 50 to 60% of hexabromobenzene and approximately 20 to 30% of tris-2,3-dibromopropylphosphate. Likewise, a particularly useful fire retardant fluoroelastomeric composition is obtained from a formulation containing 90 to 120 parts of a copolymer of vinylidene fluoride and hexafluoropropylene (Viton), 40 to 60 parts of decabromodiphenol, 10 to 20 parts of lead oxide, 3 to 10 parts of tricresylphosphate, and 2 to 7 parts of N,N-dicinnamylidene-1,6-hexane diamine.

In preparing fibers or filaments from the elastomeric compositions of the present invention, several methods can be employed depending on the nature of the elastomer in the composition. In the case of polyurethane compositions of the conventional spandex type containing fire retardant additives or of the type in which halogenated polyols are incorporated into the polymeric backbone, a wet spinning technique has been proven to be most satisfactory. In general, the polyurethane composition is dissolved in a suitable solvent to make a solution containing from about 10 to about 20% of the elastomeric composition. Solvents employed in carrying out wet spinning of polyurethanes are well known but in the present formulation, dimethylformamide was found to be particularly satisfactory. Once the polyurethane composition has been dissolved in the solvent, the solution is fed through a typical spinnerette to produce a plurality of fibers which are then passed through a suitable water bath preferably containing in addition to the water, a solvent for the fiber such as for example the same solvent used to originally dissol,e the elastomeric composition. The fibers are taken up from the aqueous-bath where excess water and solvent are removed and coalesced into a single filament, the single filament being dried by passing it slowly on a moving belt system through an elongated drying tunnel kept at between 70° and 90° C. Generally, excess aqueous bath is removed from the fibers by passing the fibers through V-shaped pulleys which tend to coalesce the individual fibers into a single filament and in effect squeeze out water. Because the modified polyurethanes possess low wet strength properties, it is necessary that the procedure employed to dry the fibers or filaments be carefully controlled. Thus it was found that the technique wherein the fibers were dried on a moving belt passing through an oven at the above described temperature gave satisfactory results and a fiber exhibiting good mechanical properties.

In producing fibers of filaments of the fluoroelastomer compositions, the technique found most successful was extrusion. In this process, the ingredients of the fluoroelastomeric composition are first blended in a suitable fashion such as on a roll mill and granulated into particles, the particles being fed to an extruder. The extruded filaments are then treated with a release agent such as talcum to prevent fiber-to-fiber adhesion. The fibers are then placed in suitable drying ovens at approximately 350°–500° F to effect curing.

The fire retardant elastomeric compositions of the present invention when formed into fibers by the techniques described above, can be woven or knitted into fabric structures exhibiting good mechanical and recovery properties and having excellent fire retardant characteristics. Moreover, the fire retardant elastomeric fibers can be blended by techniques such as knitting, weaving, etc., with nonelastic, high strength materials such as fibrous polybenzimidazoles, nylons containing isophthaloyl chloride fiberglass, etc., to produce articles of manufacture having high mechanical strength and exhibiting excellent flame retardant properties. It is also to be pointed out that rigid non-woven structures can be produced from the flame retardant compositions of the present invention.

The following non-limiting examples are presented to demonstrate more clearly the invention. In the examples which follow, as above, all proportions and percentages are by weight unless otherwise indicated. The following general procedures were employed in conducting the tests noted in following examples:

OXYGEN INDEX TEST

Flammability of the samples was tested by an oxygen-index method (tentative ASTM method, May 14, 1969). In this test, the oxygen index, N, of a material is defined as the percentage concentration of oxygen in a mixture of oxygen and nitrogen at atmospheric pressure that will maintain equilibrium burning conditions. Physically, this percentage is the lowest concentration of oxygen that will support sustained combustion of the material and is computed according to the formula:

$$N = \frac{100[O_2]}{[O_2] + [N_2]}$$

where $[O_2]$ is the oxygen concentration at equilibrium and $[N_2]$ is the associated nitrogen concentration. Thus, the smaller the value of N, the more flammable the specimen. In conducting this test, a film sample of the material 7–15 cm long × 6½ ± 0.5 mm wide × 0.025 ± 0.01 inches thick was placed vertically in the center of a column. The column was filled with gases flowing at the rate of 5 cc per second and ignited by a hydrogen flame. While normal measurements made by this method involve igniting the sample at the top, in the present case, the method was modified such that the sample was burned in the selected atmosphere at the bottom of the specimen strip. Two samples were used for each test and the reproducibility of the method was found to be ±1.

TENSILE ELONGATION MEASUREMENTS

Tensile and elongation properties of the formulated elastomer compositions were measured according to ASTM Method 412. The Instron tester was set at a speed of 20 inches/minute and the dumbell was cut with a die D.

In cases where polymers were synthesized, the following standard procedures were employed:
 A. Hydroxyl numbers ASTM D1638
 B. Acid number ASTM D1638
 C. Water ASTM D1638
 D. Free isocyanate ASTM D2572.

In conducting the flammability and mechanical property tests, both cast films and fibers were employed.

EXAMPLE I

A halogen containing polyester based polyurethane was prepared using dibromoneopentyl glycol. The purified brominated neopentyl glycol was reacted with toluene diisocyanates in a 1:2/molar ratio, respectively following which the isocyanate-terminated product was reacted with a polybutyl adipate having a molecular weight of approximately 1200. The resulting polymer possessed the following properties:

| Wt. % bromine | 10-11 |
| --- | --- |
| Oxygen index | 24-25 |
| Ultimate tensile strength, psi | 7,000 |
| Ultimate elongation, % | 500 |
| Elasticity | Good |
| Recovery | Good |
| Color | Water white |
| Wt. % soft segment | 69.6 |
| Wt. % Toluene diisocyanate | 12.1 |
| Wt. % brominated neopentyl glycol | 18.3 |

It is to be noted that the oxygen index of 25 for the polyurethane containing the brominated neopentyl glycol compares with an oxygen index of 19-20 for a normal spandex type polyurethane such as Lycra (product of Du Pont Company). Such an oxygen index i.e., 25, would be sufficient to offer protection in normal air environments, conventional spandex type polyurethanes on the other hand being flammable in normal air environments.

EXAMPLE II

The adipic acid ester of a diol obtained by reacting brominated phthalic anhydride and ethylene and propylene oxides was prepared. The resulting adipate had an acid number of 6.83 and a hydroxyl number of 41.4. The hydroxy-terminated adipate was then reacted with 4,4'-diphenylmethane diisocyanate in a molar ratio of 1:2, respectively to produce an isocyanate-terminated polyadipate prepolymer. This prepolymer was then extended with hydrazine into a spandex type polyurethane. The resulting material was a strong hard flexible and clear material having an oxygen index of 30.

EXAMPLE III

The procedure of Example II was followed except azelaic acid was substituted for the adipic acid. The material produced was strong, hard, flexible and clear, had greater elasticity than the adipate prepared as per Example II and had an oxygen index of 28.

Examples I-III demonstrate the preparation of spandex type polyurethanes having incorporated therein, as part of the polymer backbone, a halogenated polyol. As observed from the results of the examples, the polyurethanes produced have oxygen indexes of 25 or greater meaning that fibers and ultimately fabrics woven or knit therefrom could be used under atmospheric conditions without fear of the materials being flammable. This is to be compared with a conventional type spandex polyurethane which has an oxygen index of 19-20 and which in normal atmosphere is flammable. It should be noted that by incorporating certain of the fire retardant additives noted above into the polyurethanes prepared in Examples I-III, the fire retardant properties of the materials can be enhanced even more.

EXAMPLE IV

A series of elastomeric formulations comprised of a commercially available spandex type polyurethane (Lycra) and various fire retardant additives were prepared. Table I shows the compositions of the formulations and the results of the oxygen and flammability tests carried out on the formulations:

TABLE 1

| Sample No. | 1 | 2 | 3 | 4 | 5 | 6 | 7 | 8 | 9 | 10 | 11 | 12 | 13 | 14 | 15 | 16 | 17 |
| --- | --- | --- | --- | --- | --- | --- | --- | --- | --- | --- | --- | --- | --- | --- | --- | --- | --- |
| % Spandex (Lycra) | 10 | 10 | 10 | 10 | 20 | 20 | 20 | 20 | 40 | 40 | 40 | 40 | 50 | 50 | 50 | 50 | 5 |
| % Hexabromobenzene | 45 | 55 | 65 | 75 | 40 | 48 | 56 | 64 | 30 | 36 | 42 | 48 | 25 | 30 | 35 | 40 | 68 |
| % Tris-bromochloropropylphosphate | 45 | 35 | 25 | 15 | 40 | 32 | 24 | 16 | 30 | 24 | 18 | 12 | 25 | 20 | 15 | 10 | 27 |
| Oxygen Index | 40-50 | 45-50 | 50-55 | 55-60 | 35-40 | 40-45 | — | 40-45 | 35 | 35-40 | 30 | 30 | 25-30 | 25-30 | 25-30 | 30-35 | 60-65 |
| Flammability Tests | | | | | | | | | | | | | | | | | |
| Rate of Propagation (inches/second) | | | | | | | | | | | | | | | | | |
| Burning 35% | | | | | | | | | | | | | | | | | |
| O$_2$-10 psi | | SE* | | | SE | SE | SE | | | 0.71 | | | | | | | SE |
| Burning 100% | | | | | | | | | | | | | | | | | |
| O$_2$-6.2 psi | | 1.66 | | | 1.0 | 1.25 | 1.42 | | | 1.66 | | | | | | | 1.25 |
| Tensile Strength | | | | | | | | | | | | | | | | | |
| PSI | 373 | 335 | 277 | 310 | 1157 | 918 | 560 | 727 | 1750 | 1905 | 1657 | 1726 | 3090 | 2625 | 2994 | 2956 | — |
| Elongation % | 600 | 563 | 500 | 125 | 625 | 638 | 600 | 488 | 713 | 650 | 563 | 575 | 713 | 675 | 650 | 675 | — |
| Control - Spandex Alone | Oxygen Index | | 19 | | | | | | | | | | | | | | |
| | Tensile PSI | | 7100 | | | | | | | | | | | | | | |
| | Elongation % | | 700 | | | | | | | | | | | | | | |

*Self Extinguishing

EXAMPLE V

A series of flame retardant formulations containing a commercially available spandex type polyurethane (Lycra) with various flame retardant additives were formulated. The results of the oxygen index test, tensile strength and elongation tests, together with the percentages of the flame retardant additives present are shown in Table 2.

EXAMPLE VII

A series of formulations prepared from commercially available spandex polyurethanes (Lycra), various fluorinated elastomeric resins (Viton and Fluoral) and hexabromobenzene were prepared. The proportions of the components of the formulations together with the oxygen index values are shown in Table 4. It was noted that Sample 10 would burn slowly in 100% oxygen at 4.2 psi

TABLE 2

| Sample No. | Fire-Retardant Additives | % | % Halogen | % Phosphorous | Oxygen Index | Tensile Strength (psi) | % Elongation | Comments |
|---|---|---|---|---|---|---|---|---|
| 1 | Tris-2, 3-dibromopropyl phosphate | 10.66 | 25.9 | 0.9 | 25.0 | 1850 | 700 | |
|   | Hexabromobenzene | 16.66 | | | | | | |
| 2 | Tris-2, 3-dibromopropyl phosphate | 25.0 | 39.5 | 1.3 | 32.0 | 1291 | 660 | |
|   | Hexabromobenzene | 25.0 | | | | | | |
| 3 | Tetrabromoethane (Acetylenetetrabromide) | 16.33 | 29.9 | | 22.0 | 2040 | 630 | |
|   | Hexabromobenzene | 16.33 | | | | | | |
| 4 | Tetrabromoethane (Acetylenetetrabromide) | 25 | 43.7 | | 25.0 | 2045 | 670 | |
|   | Hexabromobenzene | 25 | | | | | | |
| 5 | Tris-2, 3-dibromopropyl phosphate | 25 | 39.2 | 1.3 | 28.0 | — | — | Poor film |
|   | Tetrabromoethane (Acetylenetetrabromide) | 25 | | | | | | |

EXAMPLE VI

A series of formulations containing a commercially available spandex polyurethane (Lycra) fire retardant additives and various metal oxides were prepared. The effect of change of oxygen index caused by addition of the metal oxide is shown in Table 3.

but extinguished in a 70% oxygen/30% nitrogen atmosphere at 6.2 psi. This composition (Sample 10) was also found to be tough and resilient.

TABLE 4

| Sample No. | Urethane Lycra[1] | Urethane Estane[2] | Fluorinated Polymer Viton[3] + Cpd | Fluorel[4] | Hexabromo- benzene | Oxygen Index | Viton Formulations |
|---|---|---|---|---|---|---|---|
| 1 | | 22.5 | | 18.75 | 58.75 | 65 | |
| 2 | | 15 | | 37.5 | 65.7 | 65 | |
| 3 | | 7.5 | | 37.5 | 55 | 95 | |
| 4 | | 5.7 | | 45.3 | 49 | 95 | |
| 5 | | 7.5 | | 56.25 | 36.25 | 75 | |
| 6 | | 15 | | 50 | 35 | 50 | |
| 7 | 7.5 | | | 25 | 67.5 | 40 | |
| 8 | 5.0 | | | 50 | 45.0 | 40 | |
| 9 | 2.5 | | | 75 | 22.5 | 50 | |
| 10 | 4.63 | | | | 56.4 | 80 | Viton 35.1, PbO 5.40, Diak[6] 0.40 |
| 11 | 7.5 | 1.875 | | 9.375 | 81.25 | 50 | |
| 12 | 5.0 | 3.75 | | 18.75 | 72.5 | 50 | |
| 13 | 2.5 | 5.625 | | 28.125 | 63.75 | 75 | |
| 14 | | 30 | | | 70 | 65[5] | |
| 15 | | 15 | | | 85 | 95[5] | |

[1]Trademark for polyurethane produced by E. I. du Pont de Nemours & Co.
[2]Trademark for polyurethane produced by B. F. Goodrich Chemical Co.
[3]Trademark for fluoroelastomer produced by E. I. du Pont de Nemours & Co.
[4]Trademark for fluoroelastomer produced by 3M Company
[5]30mil samples
[6]Hexamethylene Diamine Carbamate

TABLE 3

| Sample No. | % Spandex | % Organic Halide | Additive | % Additive | Oxygen Index |
|---|---|---|---|---|---|
| 1 | 17 | 70 | $Fe_2O_3$ | 13 | 45 |
| 2 | 17 | 70 | PbO | 13 | 48 |
| 3 | 17 | 70 | $Sb_2O_2$ | 13 | 48 |
| 4 | 17 | 70 | ZnO | 13 | 38 |
| 5 | 17 | 70 | $TiO_2$ | 13 | 42 |
| 6 | 17 | 70 | $Cu_2O$ | 13 | 50 |
| 7 | 28.6 | 66.5 | MgO | 4.9 | 25 |
| 8 | 28.6 | 66.5 | NiO | 4.9 | 38 |
| 9 | 17.4 | 82.6 | — | — | 50 |
| 10 | 28.6 | 71.4 | — | — | 45 |

EXAMPLE VIII

A series of fire retardant formulations containing various elastomeric resins and fire retardant additives were prepared and their flammability characteristics measured. The compositions of the formulations and the results of the tests are shown in Table 5. As can be seen from the results of the table, oxygen index values of 95-100, which are required to meet a 100% oxygen specification, can be obtained using a fluorinated elastomer in combination with hexabromobenzene and a curing agent mixture comprised of lead oxide and Diak. Samples 11-13 depict such formulations.

TABLE 5

| Sample No. | % Polyurethane (Lycra) | % Fluorinated Polymer (Viton A) | % Hexabrome benzene | Other Additives | % | Oxygen Index | Comments |
|---|---|---|---|---|---|---|---|
| 1 | 40.0 | | 42.0 | Trisbromachloropropyl phosphate | 18.0 | 35-40 | Burned 35 $O_2$ 65 $N_2$ |
| 2 | 30.0 | | 49.0 | Trisbromochloropropyl phosphate | 21.0 | 40.0 | Burned 35 $O_2$ 65 $N_2$ 10 psi .02"/sec. |
| 3 | 5.0 | 34.7 | 48.7 | Trisbromochloropropyl phosphate Lead Dioxide (mono) Diak | 6.0 5.25 0.35 | 76.0 | Burned 70 $O_2$ 30 $N_2$ 10 psi S.E. 35 $O_2$ 65 $N_2$ |
| 4 | 2.5 | 34.7 | 50.45 | Trisbromochloropropyl phosphate Lead Oxide (mono) Diak | 6.25 5.25 0.35 | 82.0 | — |
| 5 | 25.0 | | 52.5 | Trisbromachloropropyl phosphate | 22.5 | 40-45 | S.E. 35 $O_2$ 65 $N_2$ |
| 6 | 20.0 | | 56.0 | Trisbromochloropropyl phosphate | 24.0 | 45.0 | S.E. 35 $O_2$ 65 $N_2$ |
| 7 | 2.5 | 30.0 | 62.7 | Lead Oxide (Mono) Diak | 4.5 0.3 | 95.0 | Slow burning 100% $O_2$ S.E. 70 $O_2$ |
| 8 | 2.5 | 35.0 | 56.9 | Lead Oxide (Mono) Diak | 5.25 0.35 | 85.0 | S.E. 35 $O_2$ 65 $N_2$ 10 psi |
| 9 | 2.5 | 35.0 | 54.9 | Trisbromochloropropyl phosphate | 2.00 | | |
| 10 | 2.5 | 30.0 | 56.0 | Lead Oxide (Mono) Diak Trisbromochloropropyl phosphate | 4.5 0.3 6.7 | 80.0 | |
| 11 | | 36.0 | 58.20 | Lead Oxide (Mono) Diak | 5.4 0.4 | 87.0 | — |
| 12 | | 30.0 | 65.2 | Lead Oxide (Mono) Diak | 4.5 0.3 | 100 | Burns slowly in 100% $O_2$ (NASA) |
| 13 | | 25.0 | 71.0 | Lead Oxide (Mono) Diak | 3.75 0.25 | 100 | Physically very poor |

EXAMPLE IX

Three formulations were prepared; in one of the formulations (Sample 1), the elastomeric component was a polyurethane synthesized as per Example I. The second formulation (Sample 2) contained a conventional polyurethane (Lycra) and the third formulation contained a fluoroelastomer (Viton A). The formulations were tested for mechanical properties and fire retardancy. The composition of the formulations and the results of the tests are shown in Table 6.

TABLE 6

| Sample No. | Flame Retarding Additive | % F.R. in Composition | Polyurethane | Oxygen Index | Tensile Strength (psi) | % Elongation | Pressure (psi) | Composition | Propagation Rate (in./sec) | Comments |
|---|---|---|---|---|---|---|---|---|---|---|
| 1[1] | Hexabromobenzene Tris-1-bromochloropropyl phosphate | 42 18 | 40% | 45-50 | 1300 | 600 | 10.0 | 35% $O_2$ | 0.16 | Good Elasticity |
| 2 | Hexabromobenzene Tris-1-bromochloropropyl phosphate | 56 24 | 20% | 45 | 880 | 600 | 10.0 | 35% $O_2$ 65% $N_2$ | 0.13 | Fair Elasticity |
| 3[2] | Fluorinated polymer (Viton A) Hexabromobenzene Tris-1-bromochloropropyl phosphate | 30 45.0 10.2 | | 55 | 940 | 500 | 10.0 6.2 | 35% $O_2$ 65% $N_2$ 100% $O_2$ | Self Ext. 0.5 | Poor break strength and elasticity |

[1]Polyurethane used for this formulation was synthesized as per Example I.
[2]This formulation also contains 4.5% lead monoxide and 0.3% Diak.

Table 7 shows the properties of various elastomeric formulations prepared in accordance with the present invention as compared with a conventional spandex type polyurethane (Lycra). As can be clearly seen, the formulations prepared in accordance with the present invention show markedly enhanced fire retardancy over a conventional spandex type polyurethane while still retaining adequate mechanical properties.

TABLE 7

PROPERTIES OF CAST FILM FORMULATIONS

| Property | A[1] | B[2] | C[3] | D[4] | E[5] | F[6] |
|---|---|---|---|---|---|---|
| Tensile Strength, psi | — | 3530 | 1047 | 487 | 404 | 1500 |
| Elongation, % | — | 641 | 630 | 275 | 500 | 450 |
| Tear Resistance | — | 1.37 | 0.61 | 1.77 | 0.6 | — |
| Propagation Rate at 70% $O_2$-30% $N_2$, in/sec | 1.33 | 0.833 | — | 0.20 | 0.11 | S.E. in 1-7/8 in. |
| Oxygen Index | 19 | 25 | 45 | 55 | 100 | 100 |

[1]Lycra
[2]Polyurethane prepared as per Example I
[3]20% Lycra, 56% Hexabromobenzene (HBB), 24% Tris-dibromopropyl phosphate (T-23P)
[4]20% of (2), 50% HBB, 24% (T-23P)
[5]100 parts Viton A (Trademark for fluoroelastomer produced by E. I. du Pont de Nemours & Co.), 200 parts decabromodiphenyl (DBBP), 30 parts Tricresyl phosphate (TCP)
[6]100 parts Viton E (Trademark for fluoroelastomer produced by E. I. du Pont de Nemours & Co.), 100 parts DBBP, 10 parts TCP
NOTE: Samples E and F contain in addition a curing system.

EXAMPLE X

A formulation comprised of 20% Lycra, 56% of hexabromobenzene and 24% of tris-bromochloropropyl phosphate was dissolved in sufficient dimethyl formamide to give a 20% by weight solution of the urethane composition. The mixture was ball milled overnight, de-aerated and filtered. The spinning dope thus prepared was pumped through a spinnerette, the fibers being dropped into an aqueous bath to precipitate the fiber and eliminate the dimethyl formamide. The fibers were then passed through V-shaped rolls which coalesced the fibers and removed the excess water. The filament was then dried by passing it through a tunnel drier at 80° C and recovered on a take-up roll. The spinning conditions employed are shown below:

| | |
|---|---|
| Spinning Head | 0.008-inch diameter holes (40) |
| Bath Composition | 40% DMF, 60% water |
| Bath Temperature | 68° F |
| Filament Diameter | 0.0012 inch |
| Spinning Solution | 20% solids |
| Filler Particle Size | 0.5 hexabromobenzene |

The physical properties of the fibers spun and dried under the above conditions were found to be:

| | |
|---|---|
| Tensile Strength | 2000–2500 psi |
| Elongation | 475% |

Approximately 5000 ft. of this fiber were spun in deniers ranging from 180–210.

EXAMPLE XI

A series of fluoroelastomeric compositions containing Viton B with various flame retardant additives and curing agents were formulated and cured. The compositions of the formulations are shown below.

| | (Parts by Weight) | | |
|---|---|---|---|
| Sample No. | 1 | 2 | 3 |
| Viton B | 100 | 100 | 100 |
| Decabromodiphenyl | 100 | | |
| Hexabromobenzene | | 100 | 200 |
| PbO | 15 | 15 | 15 |
| Tricresyl phosphate | 10 | 10 | 10 |
| Diak #3 | 4 | 4 | 4 |

When cured, at 400° F for 16 hrs. melt extruded fibers of the above formulations exhibited the following properties:

| Sample No. | 1 | 2 | 3 |
|---|---|---|---|
| Tensile Strength, psi | 1300–1500 | 1500 | 700 |
| Elongation, % | 500–600 | 450 | 500 |
| Oxygen Index | 85 | 80 | 100 |

EXAMPLE XII

A series of formulations of various fluoroelastomeric resins in combination with certain flame retardant additives and curing agents were prepared and extruded into fibers, cured at 400° F for 16 hours and their physical and fire retardant properties evaluated. The compositions of the formulations are shown in Table 8 whereas the results of the physical and fire retardant property tests are shown in Table 9.

TABLE 8

| | Sample No. | | | | | | |
|---|---|---|---|---|---|---|---|
| Ingredients | Control | A | B | C | D | E | F |
| Viton A | — | 100 | — | — | — | — | — |
| Viton B | 100 | — | 80 | 80 | 100 | 100 | 100 |
| Viton LM | — | — | 20 | 20 | — | — | — |
| Decabromobiphenyl | 100 | 100 | 100 | 100 | 100 | 100 | 100 |
| Zinc Oxide | — | — | — | — | — | 10 | — |
| Lead Oxide | 15 | 15 | 15 | 15 | 15 | — | 15 |
| Dyphos (dibasic lead phosphate) | — | — | — | — | — | 10 | — |
| Tricresyl-phosphate | — | 10 | 10 | 10 | 10 | 10 | 10 |
| Antimony Oxychloride | — | — | — | — | — | — | 20 |
| Diak #3 | 4 | 4 | 4 | 4 | — | 4 | 4 |
| Diak #4 | — | — | — | — | 4 | — | — |

TABLE 9

| Fiber Formulation | Weight Loss on Cure (%) | Tensile Strength (psi) | Elongation (%) | Oxygen Index |
|---|---|---|---|---|
| Control | 2.7 | 1400 | 250 | 85 |
| A | 6.9 | 1200 | 410 | 85 |
| B | 6.3 | 1200 | 450 | 85 |
| C | 5.0 | 1180 | 375 | 85 |
| D | 1.9 | 1500 | 450 | 85 |
| E | 7.3 | 1490 | 400 | 85 |
| F | 6.4 | 1240 | 350 | 85 |

EXAMPLE XIII

A comparison was made between a standard cure system comprised of Diak #3 and lead oxide and a cure system comprised of maleimide peroxide and lead oxide. As seen in Table 10, formulation 2 using the maleimide system provides superior strength and good elongation without plasticizer (Tricresyl phosphate). Formulation 2 is particularly useful in making fibers.

TABLE 10

| Ingredients | Formulation | |
|---|---|---|
| | 101 | 102 |
| Viton B | 101 | 102 |
| Lead Oxide | 100 | 100 |
| N-6-carboxy phenol/maleimide | | 4 |
| Diak #3 | 4 | |
| Tricresyl phosphate | 10 | |
| Benzoyl Peroxide | | 4.5 |
| Decabromobiphenyl | 100 | 100 |
| Tensil Strength-PSI | 1300 | 2100 |
| Elongation percent | 500 | 450 |
| Oxygen Index | 95–100 | 95–100 |

EXAMPLE XIV

A formulation comprised of 100 parts of Viton B, 50 parts of decabromodiphenyl, 15 parts of lead oxide, 5 parts of tricresyl phosphate and 4 parts of N,N-dicinnamylidene-1,6-hexane diamine was blended on an unheated two-roll mill. The formulation was then granulated to particles approximately 1/16 inch in diameter and fed to an extruder where it was converted into twelve continuous filaments having diameters of approximately 13 mils. The extruder was run at 50% of capacity, producing approximately ⅛ lb. of fiber per hour (equivalent to 2000 ft/hrs. of fiber). As the fibers exited the die, they were directed individually through guides to vessels where they were collected in coiled form. The fibers were removed from the vessels and uncoiled in Pyrex trays into an open, loose pattern. During the uncoiling procedure the fibers were sprinkled liberally with talc to prevent fiber-to-fiber adhesion. The trays were then placed in air-circulating ovens at 400° F for 16 hours to cure the fibers. Following curing the fibers were wound on spools. The fibers thus produced had physical and fire retardant properties similar to those shown in Table 9.

EXAMPLE XV

This example demonstrates the production of fabrics incorporating the fire retardant elastomeric fibers of the present invention with and without non-elastic fibrous materials such as fiberglass, certain types of nylons, particularly those containing isophthaloyl chloride, polybenzimidazoles, etc. Fibers produced from fluoroelastomeric compositions (Viton B) such as those set forth in Table 8 were made into jersey knits from 800 denier fiber. The fabrics exhibited excellent two-way stretch.

In another case an 800 denier fiber produced from a fire retardant fluoroelastomeric composition similar to those of Table 8 and containing Viton B and a 200 denier continuous filament Nomex (trademark for nylon type material produced by E. I. duPont de Nemours and Company) were made into a warpknit, 36-gauge power net. The resulting fabric exhibited two-way stretch.

A 120-needle jersey consisting of Beta Fiberglas 150 and a fluoroelastomeric composition similar to those shown in Table 8 and containing Viton as a fluoroelastomer was produced. The Viton fiber, elongated 50-70%, was laid in a weft direction. The fabric exhibited stretch in the weft direction only.

A power knit fabric was also produced from a thermally stabilized polybenzimidazole fiber and a flame retardant fluoroelastomeric fiber produced from compositions similar to those shown in Table 8.

The fabrics produced from the non-elastic fibers discussed above and the flame retardant elastomeric fibers disclosed herein can be used in many applications, particularly in space exploration. For example, the fabrics can be used to produce instrument caps, sleep-restraint gear, space suits, flight suits, fabrics for aircraft, etc.

The compositions disclosed herein find application in any environment where it is desired to use an elastomeric flame resistant material having good mechanical and recovery properties. Thus for example the compositions can be used to produce open and closed cell foam coatings, tubing, hoses, gaskets and seals.

We claim:

1. A flame retardant spandex type polyurethane resin suitable for forming into fibers and which is formed from a mixture comprising:
    a. a diisocyanate selected from the group consisting of arylene diisocyanates, 4,4' diphenylmethane diisocyanate and mixtures thereof,
    b. a halogen containing difunctional polyol selected from the group consisting of dibromoneopentyl glycol, polyesters of dibromoneopentyl glycol, esters of the product obtained from the reaction of ethylene oxide and tetrabromophthalic anhydride, esters of the product obtained from the reaction of propylene oxide and tetrabromophthalic anhydride and esters of the product obtained from the reaction of ethylene oxide, propylene oxide and tetrabromophthalic anhydride, said polyol being substantially free of corresponding monofunctional and trifunctional impurities, and
    c. a urea producing compound selected from the class consisting of diamines and water,
    wherein the composition defined in (b) is first reacted with a stoichiometric excess of the composition defined in (a) to form an isocyanate terminated prepolymer, said halogen containing polyol being present in an amount sufficient to render said prepolymer substantially non-flammable in ambient environments and wherein said prepolymer is then extended by reacting said prepolymer with the composition defined in (c).

2. The resin of claim 1 wherein said prepolymer includes a hydroxy terminated polyol selected from the group consisting of polyether polyols, polyester polyols and mixtures thereof.

3. The resin of claim 1 wherein said halogen containing polyol comprises dibromoneopentyl glycol, said polyisocyanate comprises toluene diisocyanate and said resin comprises in addition a compound selected from the class consisting of polybutylene adipate and polytetramethylene ether glycol.

4. The resin of claim 1 wherein said diamine comprises hydrazine.

* * * * *